(12) United States Patent
Stein et al.

(10) Patent No.: US 8,008,623 B2
(45) Date of Patent: Aug. 30, 2011

(54) METHOD FOR LINEARIZING AN ENERGY SPECTRUM OF RADIATION DETECTORS

(75) Inventors: Jürgen Stein, Wuppertal (DE); Guntram Pausch, Dresden (DE); Yong Kong, Solingen (DE)

(73) Assignee: ICX Technologies GmbH, Solingen (DE)

( * ) Notice: Subject to any disclaimer, the term of this patent is extended or adjusted under 35 U.S.C. 154(b) by 0 days.

(21) Appl. No.: 12/821,449

(22) Filed: Jun. 23, 2010

(65) Prior Publication Data

US 2011/0012012 A1    Jan. 20, 2011

Related U.S. Application Data

(63) Continuation of application No. PCT/EP2009/056982, filed on Jun. 5, 2009.

(51) Int. Cl.
*G01T 1/00* (2006.01)
(52) U.S. Cl. .................... 250/336.1; 250/252.1; 250/395
(58) Field of Classification Search .................... 702/86; 250/336.1, 395, 252.1
See application file for complete search history.

(56) References Cited

U.S. PATENT DOCUMENTS

| | | | |
|---|---|---|---|
| 3,829,686 A | | 8/1974 | Schultz et al. |
| 5,646,410 A | * | 7/1997 | Barat et al. ..................... 250/395 |
| 5,933,792 A | * | 8/1999 | Andersen et al. ............... 702/32 |

FOREIGN PATENT DOCUMENTS

JP    2000-180390    6/2000

OTHER PUBLICATIONS

International Search Report and Written Opinion of the International Searching Authority for International Application No. PCT/EP2009/056982 issued on Jun. 17, 2010.
Herbach, Claus-M., et al., "A Technique for Estimating Detection Limits of Radio-Nuclide Identifying Detectors by Means of Computer Simulations", *IEEE Nuclear Science Symposium Conference Record*, (2008) pp. 648-655.
Johnson, Erik B., et al., "New Developments for CMOS SSPMs", *IEEE Nuclear Science Symposium Conference Record*, (2008) pp. 1516-1522.
Moses, W.W., et al., "Scintillator Non-Proportionality: Present Understandings and Future Challenges", *Transactions on Nuclear Science*, V. 55 No. 3, (Jun. 2008) pp. 1049-1053.
Pausch, Guntram, et al., "Application of La $Br_3(Ce^{3+})$ Scintillators in Radio Isotope Identification Devices", *Paper N17-8 presented at the IEEE Nuclear Science Symposium*, (Oct. 28, 2007-Nov. 3, 2007) pp. 1-6.

* cited by examiner

*Primary Examiner* — Constantine Hannaher
(74) *Attorney, Agent, or Firm* — Stein McEwen, LLP (57) ABSTRACT

A method for linearizing a radiation detector is provided, the method including measuring a pulse height spectrum of a predetermined radiation source, identifying at least one spectrum template for the predetermined radiation source, and determining a linearization function by comparing the measured pulse height spectrum with the at least one identified spectrum template. The at least one spectrum template is a predefined synthesized energy spectrum for the predetermined radiation source and for the corresponding radiation detector. Further, a detector for measuring one or more types of radiation is provided, the detector being adapted for transforming the measured pulse height spectrum in an energy-calibrated spectrum, the transformation including a linearization step, where a linearization function used with the linearization step is determined according to the inventive method.

20 Claims, 6 Drawing Sheets

METHOD FOR LINEARIZING AN ENERGY SPECTRUM OF RADIATION DETECTORS

CROSS-REFERENCE TO RELATED APPLICATION

This application is a continuation of International Application No. PCT/EP2009/056982, filed Jun. 5, 2009 in the World Intellectual Property Organization, the disclosure of which is incorporated herein by reference.

BACKGROUND OF THE INVENTION

1. Field of the Invention

Aspects of the invention relate to a method for linearizing energy spectra of radiation detectors for the measurement of one or more types of radiation, preferably X-ray, gamma, or nuclear particle radiation.

2. Description of the Related Art

Detector systems have a radiation detector for the measurement of one or more types of radiation and are well known in the prior art. One type of detector system which has a scintillation detector and a light detector. The response of scintillation detectors to gamma and other radiation is in general nonlinear. This means the appropriate signal amplitude per unit of energy (keV) at the output of the corresponding light detector, which may for example be a photomultiplier tube (PMT), a photodiode (PD), an avalanche photodiode (APD), a silicon drift detector (SDD) or a silicon photomultiplier, also known as Solid State Photomultiplier or Geiger mode APD array (SiPM), depends on the gamma energy. The signal amplitude or pulse height is usually expressed in a corresponding channel number of a pulse height spectrum.

The nonlinearities of the response of scintillation detectors are, among others, due to scintillator physics, and/or -nonlinear behavior of the photo detector. Nonlinearities (also called nonproportionalities, i.e. the conversion factor between the energy deposited in a scintillator and the number of visible photons produced is not constant) of the scintillators have been widely discussed in literature. An example of the literature is in W. W. Moses et al., IEEE Trans. Nucl. Sci. 55, 1049 (2008). They are intrinsic material properties and cannot be avoided.

Further, nonlinearities of photo detectors and/or associated electronics are often not only due to the detection principle and physics, but to imperfections of the detector chosen or due to the applied operating regime also. It might be necessary to accept those nonlinearities in order to compromise with other performance parameters (e.g. gain and noise contribution), in order to keep low the overall costs of detector systems, or because of a market not providing better detectors. Examples of such kind of nonlinearities are: Saturation effects of a photomultiplier tube (PMT) coupled to scintillators with high light output and short light decay time, which may occur at high gamma ray energies, as discussed in G. Pausch et al., IEEE Nucl. Sci. Symp. 2007, Conference Record, 963 (2007); and Saturation effects in a silicon photomultiplier (SiPM) which are due to the limited number of pixels, see e.g. Erik B. Johnson et al., IEEE Nucl. Sci. Symp. 2008, Conference Record, 1516 (2008).

Yet further, algorithms analyzing measured gamma ray spectra usually suppose a well known calibration of the energy scale. The algorithms for identifying radio-nuclides as used in many homeland security applications are relevant examples. If the response of the detector is nonlinear, the relation between channel number of the measured pulse height spectrum and absorbed gamma ray energy must be well known. This relation is called the calibration function.

The calibration function can be de-composed in a calibration factor, representing the relation between channel number and gamma energy for a fixed energy (e.g., 662 keV), and a linearization function describing the deviation from a linear scale.

Figure 1:
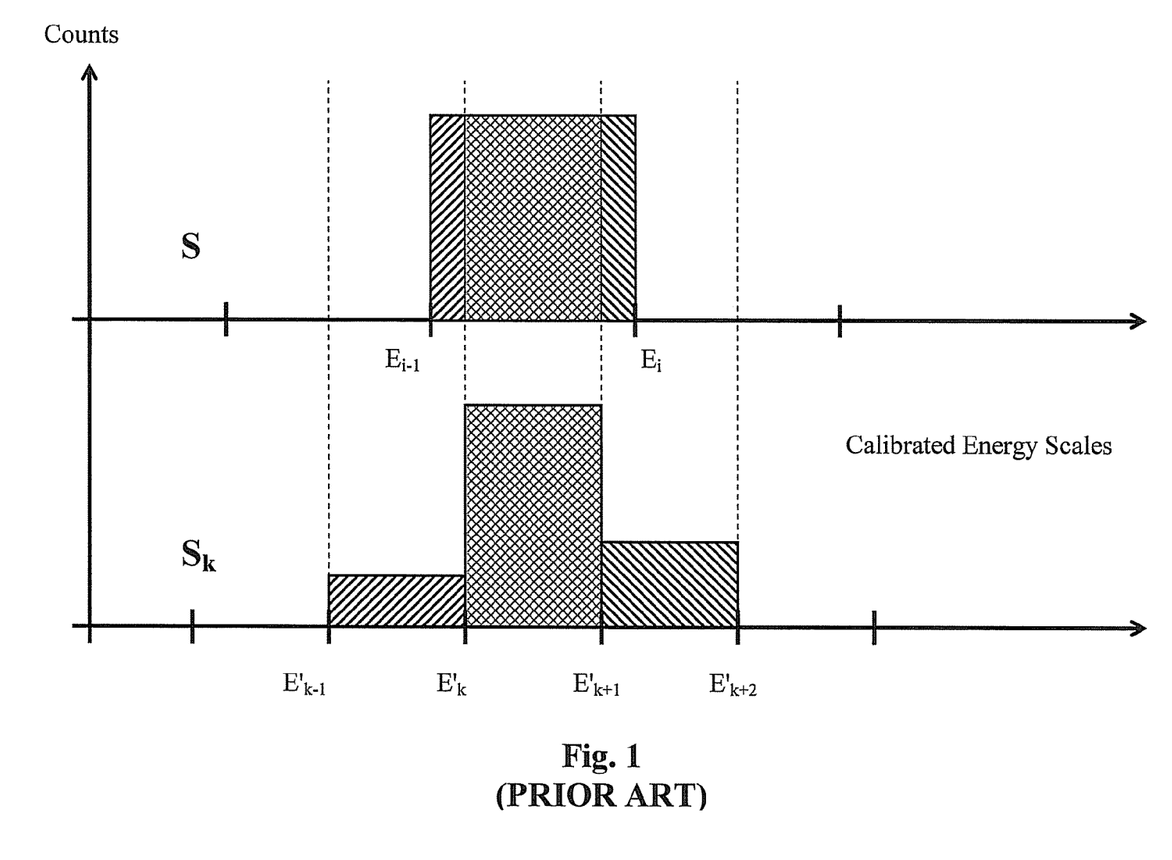
FIG. 1 sketches exemplarily a re-binning procedure as known from the state of the art.

Energy spectra measured with a certain calibration function can be re-binned to a spectrum with another calibration function. Re-binning means re-distributing the channel contents of an original spectrum to another spectrum with a changed scale by distributing the counts of all distinct channels in the (original) spectrum A to one or more channels in the (re-binned) spectrum A' according to the overlap of original and transformed channels in the calibrated energy scale (exemplarily sketched in FIG. 1). Corresponding procedures or methods have been applied e.g. in handheld radio-nuclide identifiers.

In the state of the art, the calibration function (i.e. the calibration factor and the linearization function) are usually determined by—measuring gamma ray pulse height spectra of one or more radio nuclides providing photo peaks at known energies $E_k$; determining the positions of photo peaks in the pulse height spectra by common and well known peak fit algorithms applied to the measured peaks, which provide the corresponding channel numbers $x_k$; and using the points ($E_k$, $x_k$) as reference points (nodes) for the calibration function to be determined.

The nodes ($E_k$, $x_k$) allow parameterization of the calibration function in accordance with the preferred approach (e.g. a polynomial of given grade) by least square fits or similar known procedures or methods.

This method has the disadvantage of working well only as long as a sufficient number of "good" photo peaks are available in the energy range of interest. In this context, a "good" photo peak means: the peak is well separated from other peaks, considering the actual detector resolution; the peak is due a single gamma (or X-ray) line, not due to group of lines with distances smaller than the detector resolution; and the peak is not noticeably distorted by background due to Compton scattering of more energetic gammas (X-rays) or other effects A further disadvantage is that by applying the known peak fit algorithms, the accuracy of the fit depends on proper settings of the fit range and the fit conditions (like background subtraction method, mathematical form of the fit function). Therefore, the accuracy depends on the experience of the operator. It is therefore hard to obtain a stable quality of linearization in a production process with different operators.

Unfortunately, there are only a few common radionuclides generating "good" photo peaks in the energy region below 50 keV. "Common" radionuclides here mean nuclides which are commercially available and routinely applicable in a production process. This excludes nuclides which are too expensive, hard to access, hard to handle (e.g. gases and/or liquids) or distinguished by a short decay time which would require a frequent replacement of sources. On the other hand, this is just the energy region where the light output of all known scintillators considerably deviates from a linear behavior.

Using peaks which are not "good" has been the only practicable alternative for linearization of scintillation detectors in the energy range below 50 keV. Examples for such peaks are: the ~32 keV peak due to Ba-kX rays emitted from Cs-137 sources—which is in fact composed of many components; and the ~42 keV peak due to Sm-kX and Gd-kX rays from Eu-152 sources—which is in fact composed of many components.

A further disadvantage is that if common peak fit methods or procedures are applied to such "non good" photo peaks, the result is often deteriorated by systematic errors. This is because peak fit procedures suppose the shape of the peak to be fitted is identical with the shape of the fit curve. The linearization function determined in this way is therefore characterized by relatively large uncertainties in the energy range below 50 keV.

Yet a further disadvantage is that simultaneous multi-peak fitting procedures could be applied to "non good" photo peaks by experienced experts but are hard to adapt for a robust production process with non-expert operators.

SUMMARY OF THE INVENTION

Aspects of the present invention provide an improved method for linearizing energy spectra of radiation detectors, such as scintillation detectors or Cadmium Zinc Telluride (CdZnTe or CZT) semiconductor detectors.

According to an aspect of the present invention, a new method for linearizing energy spectra of radiation detectors is provided where the known peak fit methods and algorithms are replaced by a method which is based on correlations between the measured energy spectra and spectrum templates generated for the radionuclide identification software of the detector system.

According to an aspect of the invention, this problem is solved by providing a method for linearizing a radiation detector, the method comprising at least the steps of measuring a pulse height spectrum of a predetermined radiation source, identifying at least one spectrum template for the predetermined radiation source, and determining a linearization function by comparing the measured pulse height spectrum with the at least one identified spectrum template, whereby the at least one spectrum template is a predefined synthesized energy spectrum for the predetermined radiation source and for the corresponding radiation detector.

According to an aspect of the invention, this new method does not require any manual setting of fit ranges or fit conditions. It can be run as an automated procedure controlled by corresponding software, ensures a significant improvement of the accuracy of linearization, and provides a stable quality of the instruments' setup independent of the operator.

According to an aspect of the invention, the method may further comprise a step of providing the radiation detector with the linearization function for being applied to a pulse height spectrum measured with the radiation detector in order to transform the pulse height spectrum in an energy spectrum.

According to an aspect of the invention, the predefined synthesized spectrum may comprise at least one predefined Region of Interest exhibiting a distinctive spectrum structure, wherein the step of comparing the measured pulse height spectrum with the at least one identified spectrum template comprises at least the sub-steps of selecting at least one Region of Interest from the predefined synthesized energy spectrum, and determining, by comparing the measured pulse height spectrum with the at least one identified template spectrum for each selected Region of Interest, a local gain correction factor which compensates the deviation (shift) of the corresponding distinctive spectrum structure in the measured pulse height spectrum with respect to the spectrum template, which is due to nonlinearities of the detector, wherein the local gain correction factors are used for determining the linearization function.

According to an aspect of the invention, the step of determining the local gain correction factor comprises at least the sub-steps of re-distributing (re-binning) the channel contents of the measured spectrum to channels of a further spectrum with a predefined gain correction factor by distributing the counts of all distinct channels in the measured spectrum to channels of the further spectrum according to the overlap of measured and further channels, determining correlation coefficients between the further spectrum and the spectrum template considering only channels of the further spectrum within the selected Region of Interest, and determining the gain correction factor which maximizes the correlation coefficient.

According to an aspect of the invention, the distinctive spectrum structures exhibited in the Regions of Interest may be prominent peaks, multiple peaks, or Compton edges.

According to an aspect of the invention, in a preferred embodiment, an appropriate mean energy of the Region of Interest, preferably the center or the centroid of the Region of Interest, and the local gain correction factor corresponding to the maximum correlation coefficient may be taken as a reference point for determining the linearization function.

According to an aspect of the invention, the inventive method may comprise a step of fitting a mathematical function to the reference points determined for at least two Regions of Interest, the mathematical function describing the non-linearities of the detector.

According to an aspect of the invention, in a preferred embodiment, the mathematical function may be a polynomial in the square root of the energy or the square root of the pulse height.

According to an aspect of the invention, a detector for measuring one or more types of radiation is provided by the invention, the detector being adapted for transforming the measured pulse height spectrum in an energy-calibrated spectrum, the transformation comprising a linearization step, wherein a linearization function used with the linearization step is determined according to the inventive method.

According to an aspect of the invention, the linearization function may be stored in the instrument in form of a lookup table, or in form of at least one set of polynomial coefficients.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Let S be a spectrum measured with a given radiation source and a given detector/instrument in a predefined geometry, x a channel number (or the position of any reference structure expressed in channel numbers) in the measured spectrum, $x_0$ the position of a given reference peak with known energy $E_0$ in the measured spectrum, and $E_{exp}$ the non-linearized (raw) energy scale given by $E_{exp} = c_{exp} \cdot x$ where $c_{exp}$ means a calibration factor given by $$c_{exp} = \frac{E_0}{x_0}.$$

Let T be the template spectrum corresponding to S which was synthesized for the given source and for the real detector/instrument, including absorption layers and other construction details which may affect or influence the detector response, in the predefined geometry, y a channel number (or the position of any reference structure expressed in channel numbers) in the template spectrum, $y_0$ the position of the reference peak with known energy $E_0$ (e.g., the well known photopeak of Cs-137 with $E_0 = 662$ keV) in the template, and $E_{th}$ the correct (physical) energy scale given by $E_{th} = C_{th} \cdot y$ where $$c_{th} = \frac{E_0}{y_0}.$$

Before starting the linearization process the detector or device is calibrated. This is done by setting the factor $c_{exp}$ to a given (preset) value, measuring a spectrum S with the detector exposed to a known radiation source providing a prominent photopeak, determining the centroid $x_0$ of this photopeak in the measured spectrum with peak fit or other techniques, controlling the internal detector or amplifier gain in a way that the equation $E_0 = c_{exp} \cdot x_0$ is fulfilled with the necessary accuracy.

To simplify the procedure a calibration may be provided which is identical with the calibration of the template spectrum:

$$c_{exp} = c_{th} \quad (1).$$

Other calibrations may be used with aspects of the inventive method as well.

The linearization function has to translate measured channel numbers in the correct (physical) energy, which is equivalent to a translation of the experimental to the physical energy scale. To simplify matters, the linearization function L may be introduced as $$E_{th} = L(E_{exp}) \cdot E_{exp} \text{ or }$$

$$L(E_{exp}) = \frac{E_{th}}{E_{exp}} = \frac{c_{th}}{c_{exp}} \cdot \frac{y}{x}$$

Using formula (1) this results in $$L(E_{exp}) = \frac{E_{th}}{E_{exp}} = \frac{y}{x}. \quad (2)$$

Other definitions of the linearization function may be used with the inventive method as well.

With this definition, the linearization function is $L \equiv 1$ if the detector response is linear. A deviation from a linear detector response shifts spectrum structures located in channel y of the template to channels $x \neq y$ in the measured spectrum. This is shown exemplarily in FIG. 2. The figure exhibits a spectrum S measured with a Eu-152 source (bold curve), together with the corresponding spectrum template T (thin curve). The hatched zones indicate Regions of Interest (ROI) defined in the spectrum template, which comprise distinctive spectrum structures R (peaks, or groups of peaks). One advantage of the inventive method is that Regions of Interests (ROI) can be defined and used for determining the linearization function even if the ROI comprises a group of peaks. The deviations (shifts) between structures in the template and corresponding structures in the measured spectrum are evident.

Aspects of the inventive method quantify these shifts by comparing at least one measured spectrum with the corresponding template in predefined ROIs without applying any peak fit technique. This is done as follows: Let S be a given measured spectrum, T the corresponding template, R a distinctive spectrum structure in T which is contained in a corresponding ROI defined in T. Let further $y_R$ be the position of R in T, $x_R$ the corresponding position of R in S, and $\hat{x}_R = y_R$ the expected position of R in S supposed a linear detector ($L \equiv 1$). The measured spectrum S is re-binned (as described with reference to FIG. 1) to a set of spectra $S_k$, each corresponding to an arbitrary additional gain correction factor $g_k$ according to the transformation $x \rightarrow g_k \cdot x$.

The correlation coefficients $K_k$ between $S_k$ and the template spectrum T are calculated, respectively, considering only spectrum channels within the respective ROI.

Let now $g_R$ be the gain correction factor which corresponds to the maximum correlation coefficient, i.e. the best correspondence of template spectrum T and the re-binned measured spectrum around the distinctive spectrum structure. Then $g_R$ is just the additional gain which would shift the distinctive structure to the expected (i.e., the correct) position in S: $x_R \cdot g_R = \hat{x}_R = y_R$.

Re-binning and calibrating may be performed within the detector system as well as outside the detector system.

Local gain correction factors $g_R$ obtained in this way represent reference points for the linearization function. According to formula (2) one obtains $$L(E_{exp}^R) = \frac{y_R}{x_R} = \frac{g_R \cdot x_R}{x_R} = g_R$$

with $$E_{exp}^R = E_{th}^R \cdot L(E_{exp}^R) = g_R \cdot E_{th}^R$$

or $$L(g_R \cdot E_{th}^R) = g_R$$

where $E_{th}^R$ denotes the true (physical) energy corresponding to the distinct spectrum structure, which can be approximated with an appropriate mean energy (center or the centroid) of the ROI comprising R.

Finally, the linearization function is obtained either by fitting a parameterized function according to an appropriate ansatz to a set of reference points determined as described above, or by appropriate interpolation between reference points determined as described above.

A polynomial in the square root of the energy $\sqrt{E_{exp}}$ (which is equivalent to $\sqrt{x}$) turned out to be an advantageous ansatz for a linearization function $L(E_{exp})$ as defined above.

Once the linearization function L is known, the measured spectrum can be re-binned to a well calibrated spectrum using the transformation $$\hat{x}=L(E_{exp}) \cdot x=L(c_{exp} \cdot x) \cdot x$$

where the $\hat{x}$ scale corresponds to the y scale of the template spectrum and $E=c_{exp} \cdot \hat{x}=c_{th} \cdot \hat{x}$ depicts the correct (physical) energy. This is of great practical importance because storing of the linearization function in the instrument or detector, either in form of parameters or in form of a lookup table, allows the detector (or spectrometer, or instrument) itself to provide calibrated, linearized spectra for further analysis.

In practice the comparison is performed for a couple of spectra S measured with selected radiation sources, and a corresponding set of templates with predefined ROIs. This increases the number of points which are available for fitting the linearization function, and improves the accuracy of the linearization function.

Figure 2:
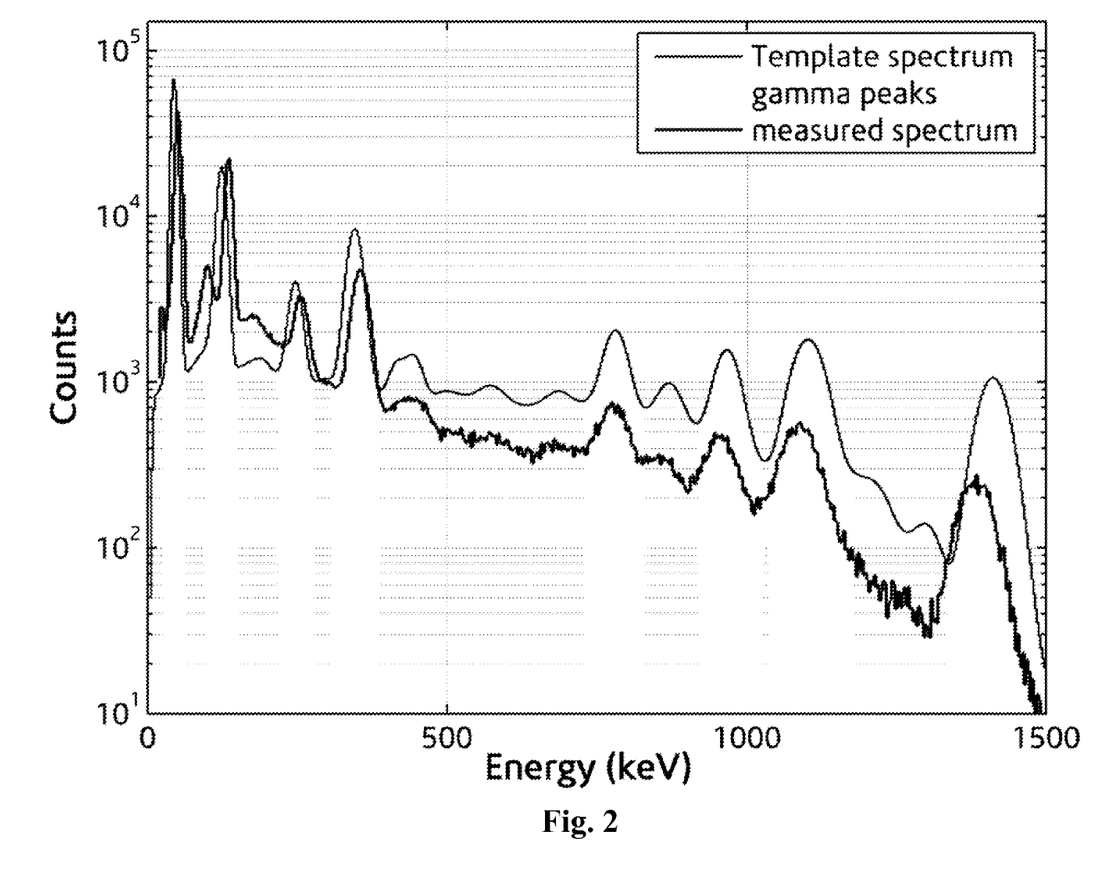
FIG. 2 illustrates the necessity and the principle of the inventive linearization method.

FIGS. 2-5 illustrate an embodiment of the inventive method with exemplary data. FIG. 2 shows a spectrum S measured with a Eu-152 source (bold curve) in comparison with the corresponding spectrum template T (thin curve). The hatched zones indicate Regions of Interest (ROI) which are defined in the spectrum template. These ROIs comprise distinctive spectrum structures R (peaks, or groups of peaks).

Figure 3:
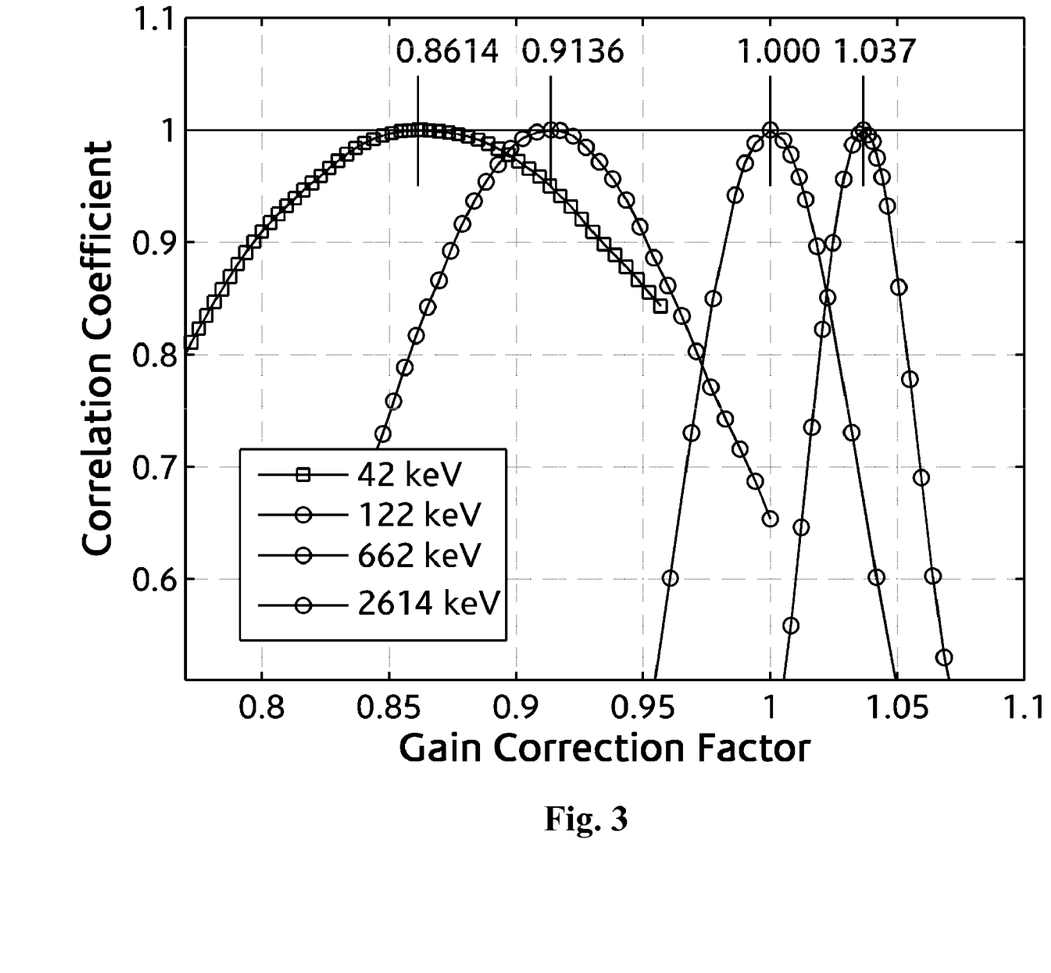
FIG. 3 shows the correlation between measured spectrum and template spectrum versus the local gain correction factor for selected Regions of Interest, defined in the template spectra of Eu-152, Cs-137, and Th-232 according to the inventive linearization method.

FIG. 3 shows the dependence of the correlation coefficient K on the local gain factors g for four distinct ROI, i.e. four spectrum structures selected for the linearization. These spectrum structures are the 662 keV photopeak in a Cs-137 spectrum, the 2614 keV photopeak in a Th-232 (decay chain) spectrum, the 122 keV photopeak in a Eu-152 spectrum, and a group of Sm- and Gd-kX rays around 42 keV in a Eu-152 spectrum.

Each curve corresponds to one ROI (spectrum structure), each data point to a single $g_k$ (i.e. to one re-binned spectrum $S_k$). The correlation coefficients $K_k$ were calculated from $$K_k = \frac{\left(\sum_i^{(ROI)} s_i \cdot t_i\right)}{\sqrt{\left[\sum_i^{(ROI)} s_i^2 \cdot \sum_i^{(R)} t_i^2\right]}}$$

where $s_i$ and $t_i$ stand for the channel contents of $S'_k$ and $T'$ which are spectra derived from $S_k$ and T by normalizing them to a maximum of 1 within the Region of Interest ROI.

Each curve exhibits a distinct maximum which allows identifying the gain factor $g_R$ (numbers above the maxima) providing the best correspondence between the re-binned measured spectrum and the template in the distinct ROI.

Figure 4:
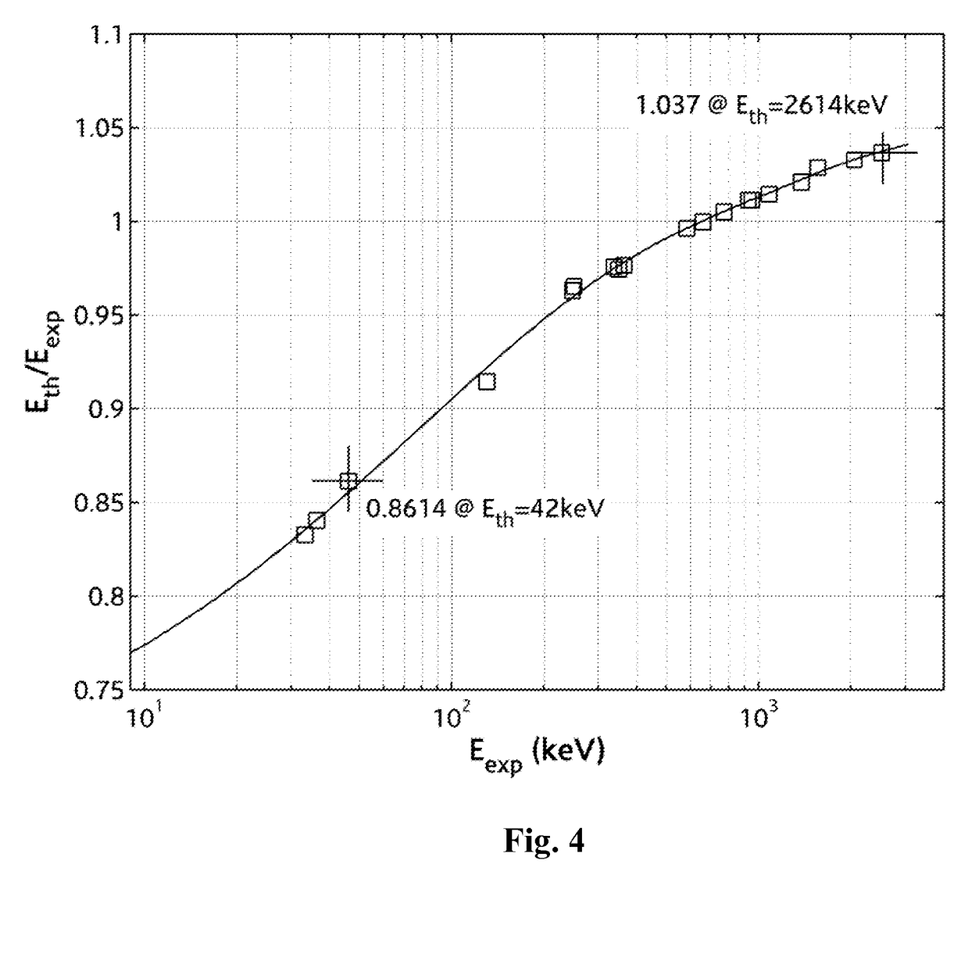
FIG. 4 shows the result of the linearization method for a randomly selected NaI(T1) detector.

The result of the inventive linearization method for a randomly selected NaI(Tl) detector is shown in FIG. 4. The plot exhibits a set of reference points $L(E_{exp}{}^R)=g_R$, obtained for multiple distinct spectrum structures R by determining the local gains providing best correspondence between measured spectra and templates around R. The solid line was obtained by fitting the coefficients of a polynomial in $\sqrt{E_{exp}}$ to the set reference points. This functional dependence is stored in the instrument.

Figure 5:
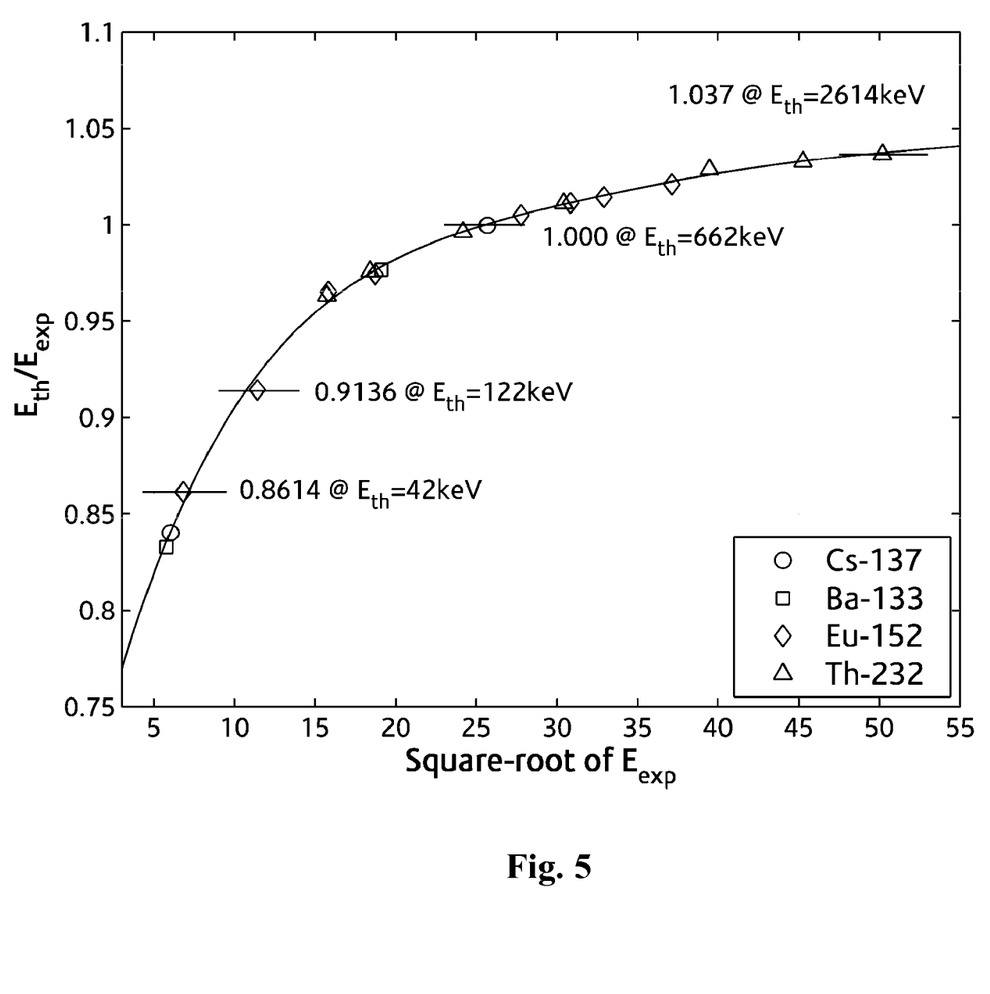
FIG. 5 shows the result of the linearization function as shown in FIG. 4 but plotted versus the square root of the energy, $\sqrt{E_{exp}}$.

FIG. 5 shows the same linearization function as shown in FIG. 4, but plotted versus $\sqrt{E_{exp}}$. Actually, a polynomial of $\sqrt{E_{exp}}$ turned out to be an advantageous representation which allows appropriate fitting of the linearization functions for NaI(Tl) and LaBr$_3$(Ce) detectors.

Figure 6:
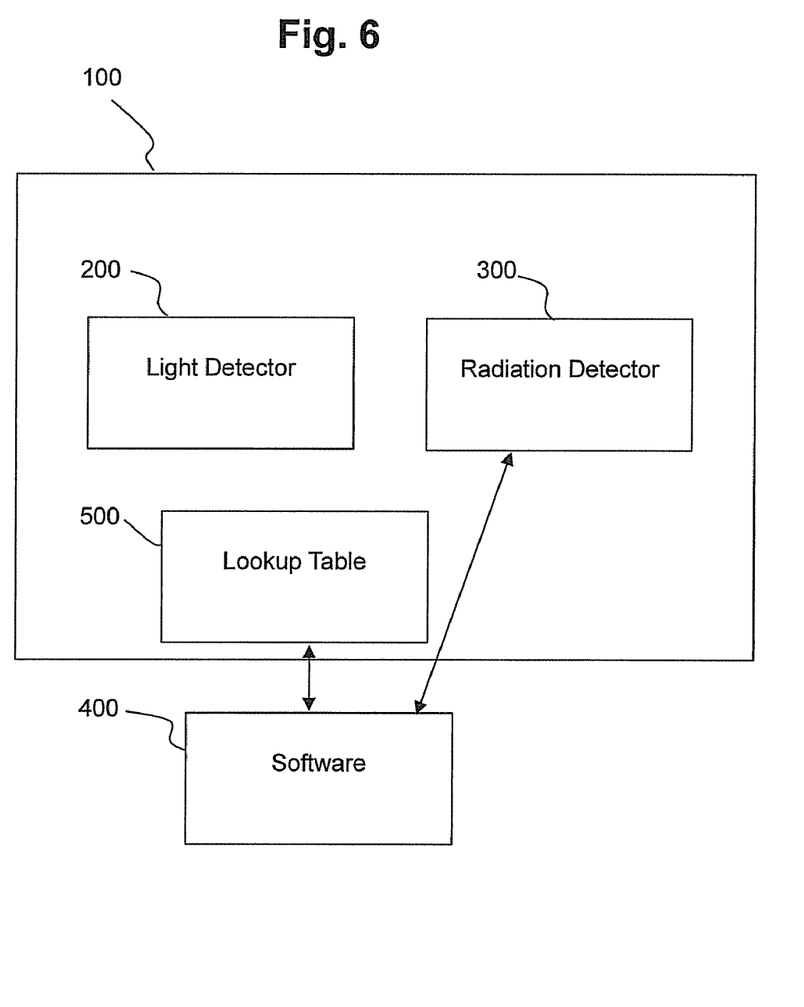
FIG. 6 shows an example of a detector for measuring one or more types of radiation and which transforms a measured pulse height spectrum in an energy-calibrated spectrum according to an embodiment of the invention.

According to an aspect of the invention shown in FIG. 6, a detector 100 for measuring one or more types of radiation is provided by the invention. The detector 100 is adapted for transforming the measured pulse height spectrum in an energy-calibrated spectrum, the transformation comprising a linearization step, wherein a linearization function used with the linearization step is determined according to the inventive method. As shown in FIG. 6, the detector 100 includes a radiation detector 300 and a light detector 200. Determination of the linearization function may be performed internally, or outside the detector 100 by using external software 400 as shown. When the linearization function is determined outside the detector 100, only the linearization function may be stored with the detector 100. The linearization function may be stored in form of a lookup table 500 as shown, or in form of at least one set of polynomial coefficients.

Further, it is possible to perform the whole linearization procedure within the detector system.

The inventive method shows many advantages. For instance, known procedures and methods do require the individual setting of various Regions of Interest in measured spectra. Those Regions of Interest have to be set individually, which can be done either automatically or manually. Fluctuations in the gain, in the spectrum shape, in the skills of operators, or even the "different eyes" of distinct operators, may influence the borders of each Region of Interest as measured in the correct energy scale. This affects the peak fits and leads to a scatter of linearization results. With aspects of the inventive method, Regions of Interest (ROI) may be defined once in the template spectrum T, i.e. in the correct (absolute) energy scale, and not in the measured spectra S. Thus, no individual setting of Region of Interest borders is required. This leads to a robust and reliable method which is well suited for automation and therefore much faster. At the same time, the accuracy is much higher and does not depend on the experience and skills of an operator. A uniform quality of the instruments setup is obtained.

Aspects of the inventive method do not require "good" peaks and can therefore provide improved accuracy of the linearization in spite of using only a few available standard sources.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for linearizing a radiation detector, the method comprising:
    measuring a pulse height spectrum (S) of a predetermined radiation source;
    identifying at least one spectrum template (T) for the predetermined radiation source; and
    determining a linearization function by comparing the measured pulse height spectrum (S) with the at least one identified spectrum template (T), wherein the at least one spectrum template (T) is a predefined synthesized energy spectrum for the predetermined radiation source and for the corresponding radiation detector.

2. The method of claim 1, further comprising providing the radiation detector with the linearization function to be applied to a pulse height spectrum measured with the radiation detector in order to transform the pulse height spectrum in an energy spectrum.

3. The method of claim 2, wherein:
the predefined synthesized energy spectrum comprises at least one predefined Region of Interest (ROI) exhibiting a distinctive spectrum structure,
the determining a linearization function by comparing comprises:
selecting the at least one Region of Interest (ROI) from the predefined synthesized energy spectrum, and
determining, by comparing the measured pulse height spectrum (S) with the at least one identified spectrum template (T) for each selected Region of Interest (ROI), a local gain correction factor which compensates a deviation of a corresponding distinctive spectrum structure in the measured pulse height spectrum (S) with respect to the spectrum template (T), which is due to nonlinearities of the detector, and
the local gain correction factor is used for determining the linearization function.

4. The method of claim 3, wherein the determining the local gain correction factor comprises:
re-distributing channel contents of the measured pulse height spectrum (S) to channels of a further spectrum ($S_k$) with a predefined gain correction factor ($g_k$) by distributing counts of all distinct channels in the measured pulse height spectrum (S) to channels of the further spectrum ($S_k$) according to an overlap of the measured and further channels,
determining correlation coefficients ($K_k$) between the further spectrum ($S_k$) and the spectrum pulse height template (T) considering only channels of the further spectrum ($S_k$) within the selected Region of Interest (ROI), and
determining the local gain correction factor ($g_R$) which maximizes the correlation coefficient ($K_k$).

5. The method of claim 4, wherein an appropriate mean energy of the Region of Interest (ROI and the local gain correction factor ($g_R$) corresponding to the maximum correlation coefficient ($K_k$) is taken as a reference point for determining the linearization function.

6. The method of claim 5, wherein the appropriate mean energy of the Region of Interest (ROI) is a center or a centroid of the Region of Interest.

7. The method of claim 3, wherein the distinctive spectrum structure exhibited in the Region of Interest (ROI) include a prominent peak, multiple peaks, or Compton edges.

8. The method of claim 7, further comprising fitting a mathematical function to the reference points determined for at least two Regions of Interest (ROI), the mathematical function describing the non-linearities of the detector.

9. The method of claim 8, wherein the mathematical function is a polynomial in the square root of the energy or the square root of the pulse height.

10. The method of claim 1, wherein:
the predefined synthesized energy spectrum comprises at least one predefined Region of Interest (ROI) exhibiting a distinctive spectrum structure,
the determining the linearization function by comparing comprises:
selecting the at least one Region of Interest (ROI) from the predefined synthesized energy spectrum, and
determining, by comparing the measured pulse height spectrum (S) with the at least one identified spectrum template (T) for each selected Region of Interest (ROI), a local gain correction factor which compensates a deviation of a corresponding distinctive spectrum structure in the measured pulse height spectrum (S) with respect to the spectrum template (T), which is due to nonlinearities of the detector, and
the local gain correction factor is used for determining the linearization function.

11. The method of claim 10, wherein the determining the local gain correction factor comprises:
re-distributing channel contents of the measured pulse height spectrum (S) to channels of a further spectrum ($S_k$) with a predefined gain correction factor ($g_k$) by distributing counts of all distinct channels in the measured pulse height spectrum (S) to channels of the further spectrum ($S_k$) according to an overlap of the measured and further channels,
determining correlation coefficients ($K_k$) between the further spectrum ($S_k$) and the spectrum pulse height template (T) considering only channels of the further spectrum ($S_k$) within the selected Region of Interest (ROI), and
determining the local gain correction factor ($g_R$) which maximizes the correlation coefficient ($K_k$).

12. The method of claim 11, wherein an appropriate mean energy of the Region of Interest (ROI and the local gain correction factor ($g_R$) corresponding to the maximum correlation coefficient ($K_k$) is taken as a reference point for determining the linearization function.

13. The method of claim 12, wherein the appropriate mean energy of the Region of Interest (ROI) is a center or a centroid of the Region of Interest.

14. The method of claim 10, wherein the distinctive spectrum structure exhibited in the Region of Interest (ROI) include a prominent peak, multiple peaks, or Compton edges.

15. The method of claim 14, further comprising fitting a mathematical function to the reference points determined for at least two Regions of Interest (ROI), the mathematical function describing the non-linearities of the detector.

16. The method of claim 15, wherein the mathematical function is a polynomial in the square root of the energy or the square root of the pulse height.

17. A detector which measures one or more types of radiation and, transforms a measured pulse height spectrum in an energy-calibrated spectrum using a linearization step determined according to the method of claim 1.

18. The detector of claim 17, wherein the linearization function is stored in the detector as a lookup table, or as at least one set of polynomial coefficients.

19. The method of claim 1, wherein the determined linearization function corrects nonlinearities of a response of the radiation detector to detected radiation.

20. The method of claim 1, further comprising calibrating the radiation detector by measuring a spectrum when the radiation detector is exposed to a known radiation source providing a prominent photopeak, determining a centroid of this photopeak in the measured spectrum with a peak fit, and controlling an amplifier gain according to the determined centroid, wherein the determining the linearization function is performed after the radiation detector is calibrated.

* * * * *